(12) United States Patent
Lang et al.

(10) Patent No.: US 11,318,908 B2
(45) Date of Patent: May 3, 2022

(54) METHOD FOR GENERATING A TRIGGER SIGNAL FOR TRIGGERING AT LEAST ONE SAFETY FUNCTION OF A MOTOR VEHICLE

(71) Applicant: Robert Bosch GmbH, Stuttgart (DE)

(72) Inventors: Gunther Lang, Stuttgart (DE); Simon Koenig, Moeckmuehl (DE)

(73) Assignee: Robert Bosch GmbH, Stuttgart (DE)

( * ) Notice: Subject to any disclaimer, the term of this patent is extended or adjusted under 35 U.S.C. 154(b) by 150 days.

(21) Appl. No.: 16/645,553

(22) PCT Filed: Aug. 15, 2018

(86) PCT No.: PCT/EP2018/072120
§ 371 (c)(1),
(2) Date: Mar. 9, 2020

(87) PCT Pub. No.: WO2019/063187
PCT Pub. Date: Apr. 4, 2019

(65) Prior Publication Data
US 2020/0262385 A1   Aug. 20, 2020

(30) Foreign Application Priority Data

Sep. 26, 2017  (DE) .......................... 102017217015.8

(51) Int. Cl.
*B60R 21/36* (2011.01)
*B60R 21/0136* (2006.01)
(Continued)

(52) U.S. Cl.
CPC .......... *B60R 21/36* (2013.01); *B60R 21/0132* (2013.01); *B60R 21/0134* (2013.01); *B60R 21/0136* (2013.01); *B60W 2554/4029* (2020.02)

(58) Field of Classification Search
CPC ................................................ B60W 2422/90
See application file for complete search history.

(56) References Cited

U.S. PATENT DOCUMENTS 9,221,414 B2 * 12/2015 Schondorf .............. B60R 19/18
10,259,412 B1 * 4/2019 Krishnappa ........... B60R 19/483
(Continued)

FOREIGN PATENT DOCUMENTS

DE   102011011962 A1   8/2012
DE   102014208143 A1   11/2015
(Continued)

OTHER PUBLICATIONS

International Search Report for PCT/EP2018/072120, dated Nov. 6, 2018.

*Primary Examiner* — Peter D Nolan
*Assistant Examiner* — Ce Li Li
(74) *Attorney, Agent, or Firm* — Norton Rose Fulbright US LLP; Gerard Messina

(57) ABSTRACT

A method for generating a trigger signal for triggering at least one safety function of a motor vehicle. The method includes at least the following method steps: a) receiving respective signals from at least two pressure tube sensors, b) determining at least one collision parameter from the signals received according to step a), c) outputting the trigger signal for the at least one safety function as a function of the at least one collision parameter determined in step b).

12 Claims, 3 Drawing Sheets

(51) Int. Cl.
    *B60R 21/0134*    (2006.01)
    *B60R 21/0132*    (2006.01)

(56) References Cited

U.S. PATENT DOCUMENTS

2015/0274118 A1* 10/2015 Schondorf ............... G01N 3/30
                                                              701/45
2015/0291122 A1* 10/2015 Seo ..................... B60R 21/0136
                                                               701/45
2015/0314744 A1* 11/2015 Lang ..................... B60R 21/013
                                                              340/436

FOREIGN PATENT DOCUMENTS

| JP | 2007118830 A | 5/2007 |
| --- | --- | --- |
| JP | 2015074422 A | 4/2015 |
| JP | 2016203775 A | 12/2016 |

* cited by examiner

METHOD FOR GENERATING A TRIGGER SIGNAL FOR TRIGGERING AT LEAST ONE SAFETY FUNCTION OF A MOTOR VEHICLE

BACKGROUND INFORMATION

Pressure tube sensors (PTSs) have been used for a number of years for detecting a pedestrian collision on a front side of a motor vehicle. The pressure tube is generally situated between a bumper crossbeam and absorption foam situated in front of same. The pressure tube is filled with air, and is closed off with a pressure sensor at each end. The deformation of the foam that occurs during a pedestrian collision thus results in compression of the tube, as the result of which a pressure signal is measured by the two pressure sensors. This pressure signal is read in by a control unit, generally the central airbag control unit, where it is processed in order to detect a pedestrian collision.

Vehicle accidents are conventionally recognized by an airbag control unit, mounted on the vehicle tunnel, by use of an acceleration sensor system, optionally supplemented by an external sensor system.

SUMMARY

A particularly advantageous example method for generating a trigger signal for triggering at least one safety function of a motor vehicle in accordance with the present invention is presented herein. Advantageous refinements of the example method in accordance with the present invention are described herein.

The example method is based in particular on the finding that a pressure tube may be used not only for pedestrian recognition, but also for improved recognition of vehicle accidents. This applies in particular to particular types of vehicle collisions such as a pole impact in the mid-region of the vehicle. Since no crash structures of the vehicle are affected in a pole impact, it may be detected only relatively late with a conventional collision sensor system, whereas it may be recognized very quickly by the pressure tube. In addition, by use of the described method the pedestrian protection recognition may be enhanced and made more robust.

At least two pressure tube sensors are provided for the described method. Based on these sensors, in particular important features of collisions, such as a collision speed (which may also be referred to as an intrusion speed) and/or a direction of the collision, may be identified and used for improved collision recognition and triggering of safety functions (such as restraint means).

Thus, by use of the described method it is possible in particular to control restraint means in a more precise and robust manner. This may take place in particular in that the parameters of collision speed and direction of impact, which are vitally important for the severity of the collision, may be explicitly determined. This is not possible with a conventional sensor system. Instead, present collision algorithms operate with implicit features that allow only indirect conclusions to be drawn concerning these key parameters. This results in relatively inaccurate recognition of the type and severity of the collision.

A system that includes two pressure tube sensors (thus, a 2-PTS system) is preferably used for the described method. The pressure tube sensors are preferably situated apart from one another. A system that includes two pressure tube sensors is in particular a system with two well-defined contact switches (the pressure tube sensors). The pressure tube sensors are preferably situated in a (in particular front) crumple zone of the motor vehicle. Key parameters for the severity of the collision, in particular the collision speed and/or the direction of impact, may thus be determined. Explicitly determining the collision speed and/or the direction of impact may allow significantly more precise and accurate collision recognition, and thus, control of the restraint means required for the ascertained severity of the collision.

The described method includes in particular method steps a) through c), which are preferably carried out in the stated order.

Signals are received from each of at least two pressure tube sensors in step a) of the described method.

The pressure tube sensors preferably each include an air-filled tube (preferably made of a material containing silicone) that is closed off with a pressure sensor at one end, preferably at both ends. In the following discussion, as an example it is assumed that two pressure sensors are provided for each pressure tube sensor. Data may be recorded with the pressure sensors, from which an impact on the tube may be deduced. Based on these data, in particular a signal of the pressure tube sensor may be generated via an appropriate electronics system. The signal may in particular indicate the fact that an impact has been detected with the pressure tube sensor. The point in time that the signal is output may indicate the point in time of the impact (possibly delayed by a processing time). Alternatively, the signal may also be continuously output and changed in a predefined manner when an impact is detected.

The signals of the at least two pressure tube sensors are preferably received by a control unit that is intended and configured for carrying out the described method.

At least one collision parameter is determined from signals received according to step a), in step b) of the described method.

Any variable that may characterize an accident of a motor vehicle is suitable as a collision parameter. The collision parameter is preferably defined in such a way that it allows a conclusion to be drawn concerning the type and/or severity of an accident. The collision parameter may in particular be determined in the control unit, using appropriate software.

A trigger signal for the at least one safety function is output in step c) of the described method as a function of the at least one collision parameter determined in step b).

The at least one safety function may be, for example, an airbag, a seat belt tensioner, or an intervention into the control system of the motor vehicle (for example, via automatic emergency braking and/or an automatically initiated evasive maneuver). The motor vehicle preferably includes a plurality of safety functions. The at least one safety function may be triggered in particular by a trigger signal that is preferably output in particular by the control unit. The type and/or severity of the accident that is recognizable from the collision parameter may be taken into account in step c) of the described method in the triggering of the at least one safety function. Thus, the point in time and/or the type of triggering of the at least one safety function may be determined as a function of the collision parameter. In addition, it may be determined whether the at least one safety function is to be triggered at all. In addition, for multiple safety functions a selection of safety functions to be triggered may be made, and/or a decision may be made regarding the particular order in which they are to be triggered.

In one preferred specific embodiment of the example method, respective signals are received in step a) from at least two pressure tube sensors that are spaced apart from one another at least in the travel direction of the motor vehicle.

In the present context, the travel direction is understood to mean the direction in which the motor vehicle is moving during typical forward travel. A frontal impact may be detected initially by the pressure tube sensor situated farther to the front in the travel direction, and only after a delay, also detected by the other pressure tube sensor. In particular a collision speed may be determined by the time difference with which the two pressure tube sensors detect the impact.

The pressure tube sensors may likewise be spaced apart from one another in a vertical direction, in particular transverse (or perpendicular) to the travel direction. However, it is also possible for the pressure tube sensors to be situated at the same height in the vertical direction.

In another preferred specific embodiment of the example method, the signals of the at least two pressure tube sensors received in step a) in each case represent at least one of the following parameters:

an impact time $t_1$, $t_2$ and
an impact location $s_1$, $s_2$.

The statement that the received signals represent mentioned parameters of impact time ($t_1$, $t_2$) and impact location ($s_1$, $s_2$) means the information contained in the received signals, from which the mentioned parameters are ascertainable. Pressure patterns regarding the signals received from the pressure tube sensors are preferably received in step a). Based on these pressure patterns, it is then possible to compute an impact time ($t_1$, $t_2$) and an impact location ($s_1$, $s_2$) in a control unit (preferably the control unit in which the further method steps are also carried out).

In the event of an impact with an obstacle, initially the first pressure tube (at point in time $t_1$), and subsequently the second pressure tube (at point in time $t_2$), are deformed in succession. Both deformations result in an immediate pressure rise, and thus a pressure signal to the pressure sensors that close off the particular pressure tubes. The particular points in time $t_1$ and $t_2$ may be detected in the control unit, for example via threshold value exceedances of a first pressure sensor of the respective pressure tube sensor.

Impact time $t_1$ or $t_2$ is understood to mean the point in time at which an impact is detected with the first or second pressure tube sensor. Impact location $s_1$ or $s_2$ is the location at which the impact has been detected with the first or second pressure tube sensor. $s_1$ and $s_2$ are preferably defined along the respective pressure tube sensors. Thus, for example, $s_1$ and $s_2$ may indicate the distance between the location of the impact and a midpoint of the pressure tube.

In another preferred specific embodiment of the method, the at least one collision parameter determined in step b) is at least one of the following parameters:

a magnitude of a collision speed $\bar{v}_{intr}$,
a component of collision speed $v_{intr,x}$ along the travel direction of the motor vehicle,
a collision angle $\alpha$.

Collision speed $v_{intr}$ is a vectorial variable that includes at least one component along travel direction x of the motor vehicle, $v_{intr,x}$, and a component perpendicular thereto, $v_{intr,y}$. $\bar{v}_{intr}$ is the magnitude of vector $v_{intr}$. Collision angle $\alpha$ is the angle at which a collision object strikes the motor vehicle, i.e., its front side.

Based on time difference $\Delta t = t_2 - t_1$ between points in time $t_2$ (pressure rise in the second pressure tube) and $t_1$ (pressure rise in the first pressure tube), and longitudinal distance d in the travel direction between the two pressure tube sensors, (averaged) collision speed $\bar{v}_{intr,x}$ may be directly ascertained from $$\bar{v}_{intr,x} = d/\Delta t. \tag{1}$$

For the case that both pressure tube sensors are mounted a large distance apart in the motor vehicle (in particular in front of fairly hard crash structures such as crash boxes), in a good approximation it may be assumed that in the early collision phase, in which the two pressure tube sensors are deformed, an appreciable decrease in speed has not yet taken place due to the collision. This applies even more, the higher the collision speed. This means that the two collision partners are still moving virtually at the initial speed. This means that the averaged collision speed ascertained according to equation (1) also corresponds to initial collision speed $v_{intr,x}(0)$:

$$\bar{v}_{intr,x} \approx v_{intr,x}(0). \tag{2}$$

For the case that the second pressure tube sensor is situated farther to the rear in the motor vehicle in the travel direction, and fairly hard crash structures such as crash boxes must be deformed prior to the deformation of the second pressure tube sensor, a decrease in the collision speed is already present at point in time $t_2$. This applies in particular for slow collisions, in which the deformation of the crash structures results in a greater decrease in speed. In such a case, the measured average collision speed will be slightly lower than the initial collision speed:

$$\bar{v}_{intr,x} < v_{intr,x}(0), \tag{3}$$

and in particular will be more apparent the slower the collision. Interestingly, $\bar{v}_{intr,x}$ measured in this way is even better suited for discriminating between fast and slow collisions than is the initially "more correct" information $v_{intr,x}(0)$.

If initial $v_{intr,x(0)}$ is still to be ascertained in this case, the decrease in the collision speed may be estimated via decrease in speed $dv(t)$ of the motor vehicle during the collision. For this purpose, in another preferred specific embodiment of the method, in particular at least one deceleration of the motor vehicle due to a collision is taken into account in step b) in determining a collision speed $v_{intr}$ as the at least one collision parameter.

The decrease in speed of the motor vehicle is preferably ascertained in the control unit (which in particular may be the central airbag control unit) by integrating measured longitudinal acceleration signal $a(t)$. It is pointed out here that the collision speed during the collision may be determined from the relative speed of the other parties in the accident and the rigidity ratios, whereas the decrease in speed is determined from the relative speed of the other parties in the accident and the mass ratios. However, since vehicle masses and rigidities show a certain correlation, it is a good approximation to set the decrease in the collision speed to a decrease in speed that is rescaled with a vehicle-specific factor f. Ideally, factor f also contains information concerning the mass and rigidity of the other party in the accident that is obtained via C2X communication.

In general, the following may be set:

$$v_{intr,x}(t) = v_{intr,x}(0) - f \cdot dv(t). \tag{4}$$

$$v_{intr,x}(t_1) = v_{intr,x}(0) - f \cdot dv(t_1) \approx v_{intr,x}(0). \tag{5}$$

$$v_{intr,x}(t_2) = v_{intr,x}(0) - f \cdot dv(t_2). \tag{6}$$

The simplification in equation (5) reflects the fact that there is no measurable decrease in speed of the overall vehicle during deformation of the bumper foam. Therefore, in particular $dv(t_1)$ may then be disregarded.

Assuming a linear drop, for example the following applies:

$$\bar{v}_{intr,x} = (v_{intr,x}(t_1) + v_{intr,x}(t_2))/2 = v_{intr,x}(0) - (dv(t_1) + dv(t_2))/2 \quad (7)$$

and thus, $$v_{intr,x}(0) = d/\Delta t + (dv(t_1) + dv(t_2))/2 \approx d/\Delta t + dv(t_2)/2. \quad (8)$$

Although the $dv(t)$ curve may be precisely determined, the assumption of a linear decrease does not absolutely have to be made. In addition, an exact determination of $v_{intr,x}(0)$ is possible. Integration of $v_{intr,x}(t)$ between points in time $t_1$ and $t_2$ results in particular in distance d between the two pressure tube sensors:

$$d = \int_{t1}^{t2} v_{intr,x}(t)dt = v_{intr,x}(0) \cdot \Delta t - \int_{t1}^{t2} dv(t)dt$$

and thus, $$v_{intr,x}(0) = \frac{d + \int_{t1}^{t2} dv(t)dt}{\Delta t} \quad (9)$$

Thus, a particularly general rule for ascertaining the initial collision speed is as follows: determining points in time $t_1$ and $t_2$ and forming difference $\Delta t$; integrating the decrease in speed between these two points in time, and computing according to equation (9).

However, in practice, equations (8) and also (1) allow sufficiently accurate determinations.

In another implementation of equation (1), it is also possible to not explicitly compute the collision speed at all, but instead to consider only time difference $\Delta t$, which is inversely proportional to the collision speed.

Impact position $s_1$ or $s_2$ may be ascertained based on propagation time difference $\Delta T = T_L - T_R$ between the pressure signals on the left and right sides of a pressure tube sensor. Since the different paths from impact point s (measured from the center axis, for example) to the two pressure sensors (between which the path difference is thus 2s) result in different signal propagation times, impact position s is given by time difference $\Delta T$ and speed of sound c:

$$s = c\Delta T/2. \quad (10)$$

When this method is used on both pressure tube sensors in the present sensor configuration, two impact locations $s_1$ and $s_2$ are obtained. The differences between two locations allow conclusions to be drawn concerning the direction of the collision. For example, collision angle $\alpha$ may be directly ascertained via $$\tan(\alpha) = (s_1 - s_2)/d. \quad (11)$$

Here as well, it is possible to not explicitly compute the collision angle according to equation (11) at all, but instead to use the difference between impact locations $s_1 - s_2$.

For collisions where $\alpha \neq 0$, in fact a longer intrusion path is necessary in order to go from a deformation of the first pressure tube sensor to a deformation of the second pressure tube sensor. This intrusion path is $$I = \sqrt{d^2 + (s_1 - s_2)^2}. \quad (12)$$

Instead of longitudinal collision speed $\bar{v}_{intr,x}$ from equation (1), the magnitude of average vectorial collision speed $\bar{v}_{intr}$ results in $$\bar{v}_{intr,x} = \frac{I}{\Delta t} = \frac{\sqrt{d^2 + (s1 - s2)^2}}{\Delta t}. \quad (13)$$

The direction is already specified by collision angle $\alpha$ determined above.

The ascertained features, in particular the ascertained collision speed and/or the ascertained collision angle, may be used for directly or indirectly controlling the at least one safety function (in particular restraint means). In particular the following two specific embodiments are preferred for this purpose.

In one preferred specific embodiment of the method, the trigger signal is output in step c) when a component $v_{intr,x}$ of the collision speed along the travel direction of the motor vehicle or a magnitude $\bar{v}_{intr}$ of a collision speed exceeds a first predefined threshold.

The ascertained features of the collision speed and the collision direction represent the key parameters for the severity of an accident, and could therefore be directly used for controlling the at least one safety function. However, this requires a very robust integration of the pressure tubes into the motor vehicle, and full capability for diagnosing errors in the pressure tube system (in particular including ruptures in the pressure tube).

In this specific embodiment, for trigger thresholds of a front algorithm (such as the seat belt tensioner, first stage airbag, second stage airbag, etc.), a first threshold Thd may be set to one of the collision speeds.

The first threshold may in particular be predefined as a fixed value.

In another preferred specific embodiment of the method, the predefined first predefined threshold is predefined at least as a function of an impact location $s_1$, $s_2$ of at least one of the pressure tube sensors and/or of a collision angle $\alpha$.

The first predefined threshold may be varied in particular as a function of collision angle $\alpha$. A triggering decision may be made, for example, via averaged longitudinal collision speed $\bar{v}_{intr,x}$ according to equation (2) when $$\bar{v}_{intr,x} > \text{Thd}(\alpha). \quad (14)$$

For example, for $\alpha = 0°$ a first threshold of 20 km/h, and for $\alpha = 30°$ a first threshold of 26 km/h, preferably applies. In particular, a threshold value curve may be defined as a continuous function of collision angle $\alpha$. Alternatively, the threshold values may be varied in stages over certain angular ranges.

In addition, the further parameters of the collision speed described above may be used for the threshold value comparison. If the magnitude of the vectorial collision speed is used for a threshold value query, analogously to equation (14), the variation as a function of collision angle $\alpha$ may be less, for example.

In another preferred specific embodiment of the method, the trigger signal is output in step c) when a difference $\Delta t$ between impact times $t_1$, $t_2$ of at least two of the pressure tube sensors falls below a second predefined threshold.

The second threshold may in particular be predefined as a fixed value.

In another preferred specific embodiment of the method, the second predefined threshold is predefined at least as a function of an impact location $s_1$, $s_2$ of at least one of the pressure tube sensors and/or of a collision angle $\alpha$.

In this specific embodiment, in addition to the collision direction, impact location $s_1$ on the first pressure tube is also used. Thus, in particular so-called offset collisions (in which $s_1$ is much different from zero, but $\alpha$ is close to zero) may be differentiated from collisions with full coverage (in which both $s_1$ and $\alpha$ are close to zero). Equation (14) is then generalized to $$\overline{v}_{intr,x} > \text{Thd}(\alpha, s_1) \tag{15}$$

or further generalized to $$\overline{v}_{intr,x} > \text{Thd}(s_1, s_2), \tag{16}$$

since according to equation (11), collision angle $\alpha$ itself is a function of $s_1$ and $s_2$.

It is also possible to set the threshold value queries directly to measured time difference $\Delta t$. An equivalent criterion for equation (16) would then be, for example, $$\Delta t < \text{Thd}'(s_1, s_2). \tag{17}$$

In another preferred specific embodiment of the method, the trigger signal is output in step c) also as a function of at least one parameter of an additional collision recognition system.

In this specific embodiment, the triggering of the at least one safety function does not take place solely via the pressure tube sensor system in the front area of the motor vehicle. In addition, for example a conventional acceleration sensor system may be incorporated as an additional collision recognition system. A preferred approach is for a sensitivity of a conventional acceleration-based algorithm to be influenced in step c). This influencing is preferably a function of the recognized collision speeds, time difference $\Delta t$ between impact times $t_1$ and $t_2$, collision angle $\alpha$, and/or impact locations $s_1$ and $s_2$. For example, sensitization may take place when conditions similar to equations (14) through (17) are satisfied. The sensitization itself may take place by lowering trigger thresholds in the existing trigger logic systems, or also by switching over to other, more sensitive trigger logic systems. This procedure may also be referred to as a "path concept."

As a further aspect, a control unit for a motor vehicle is presented which is configured for carrying out the described method. The particular advantages and embodiment features described above for the method are applicable and transferable to the control unit.

Furthermore, a computer program is presented which is configured for carrying out all steps of the described method. In addition, a machine-readable memory medium is presented, on which the described computer program is stored. The particular advantages and embodiment features described above for the method and the control unit are applicable and transferable to the computer program and the machine-readable memory medium.

Further particulars of the present invention as well as one exemplary embodiment, to which the present invention is not, however, limited, are described in greater detail with reference to the figures.

DETAILED DESCRIPTION OF EXAMPLE EMBODIMENTS

Figure 1:
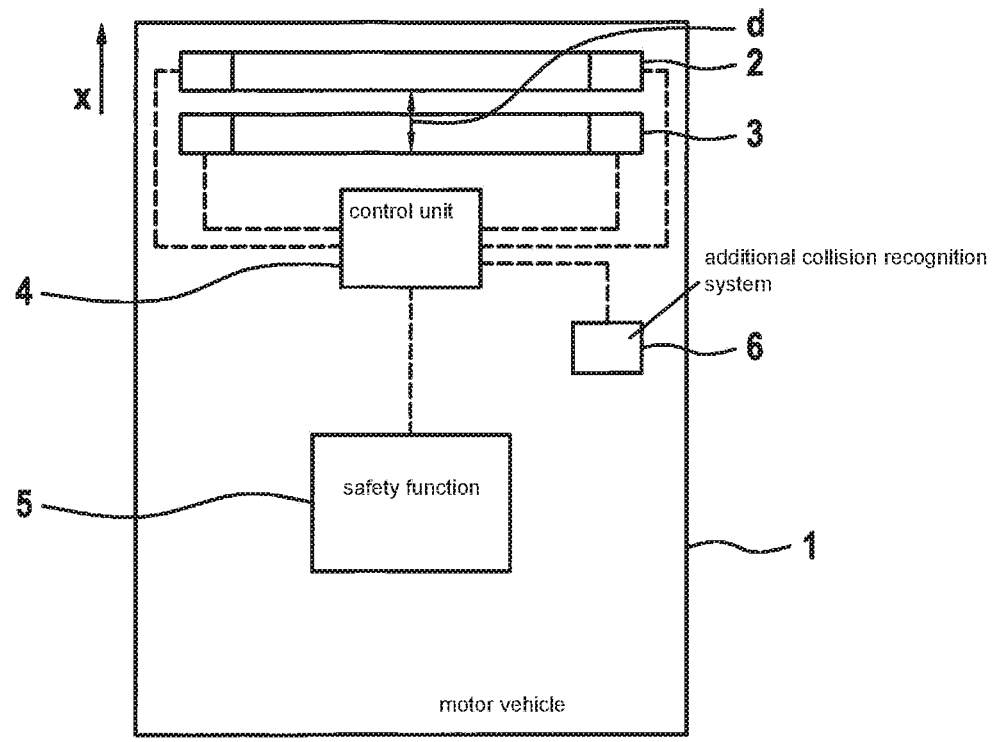
FIG. 1 shows an illustration of a motor vehicle including two pressure tube sensors, which is configured for carrying out the described method.

FIG. 1 shows a motor vehicle 1 that includes a first pressure tube sensor 2 and a second pressure tube sensor 3. Both pressure tube sensors 2 and 3 are connected to a control unit 4. A safety function 5 may be triggered via control unit 4. For this purpose, control unit 4 is also connected to an additional collision recognition system 6. The two pressure tube sensors 2 and 3 are spaced apart from one another by a distance d in travel direction x (from bottom to top in this illustration). Vertical direction z is likewise denoted.

Figure 2:
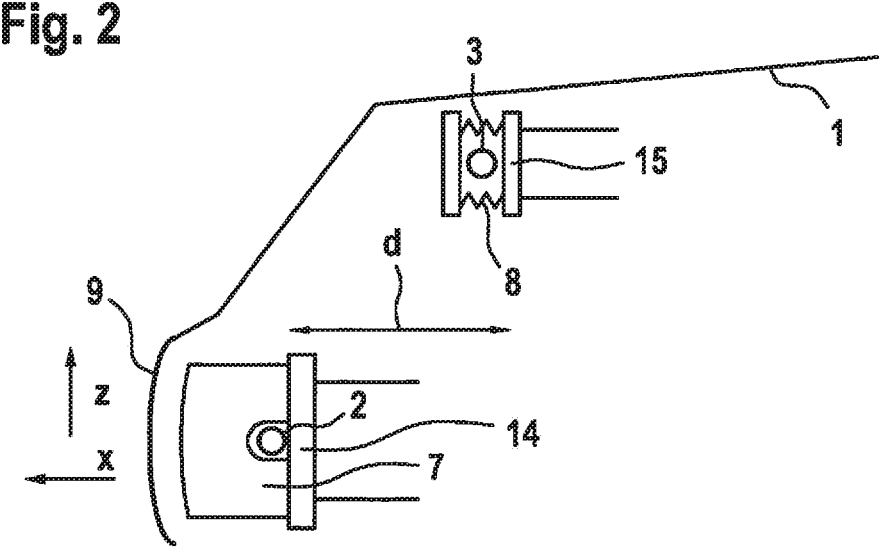
FIG. 2 shows a side cross-sectional illustration of the motor vehicle from FIG. 1.

FIG. 2 shows one possible implementation of a 2-PTS system in motor vehicle 1 from FIG. 1. First pressure tube sensor 2 is installed in a conventional manner in a bumper 9, in a groove of absorption foam 7 that rests on a crossbeam 14. In the present example, second pressure tube sensor 3 is mounted on a radiator crossbeam 15. A mechanical element, not foam, is provided as an absorption element 8 (energy absorber). The specific design is not critical. The task of absorption element 8 is solely to couple the force to second pressure tube sensor 3 in a controlled manner and to mechanically protect same. The example in FIG. 2 shows in particular that pressure tube sensors 2 and 3 do not necessarily have to be situated at the same height (in the direction from top to bottom in the illustration).

Figure 3:
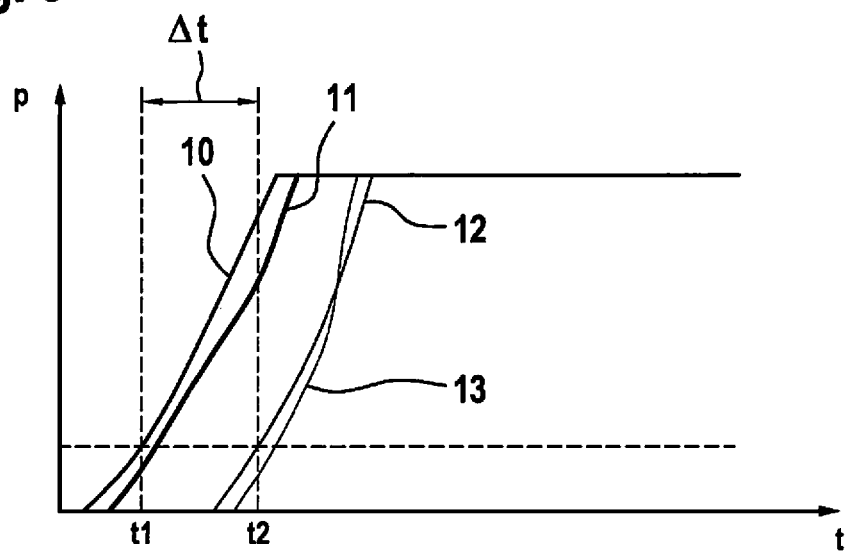
FIG. 3 shows a time curve of pressures in the pressure tube sensors of the motor vehicle from FIGS. 1 and 2.

FIG. 3 shows a time curve of pressures p in pressure tube sensors 2 and 3 of motor vehicle 1 from FIGS. 1 and 2. A first pressure signal 10 is recorded with a left pressure sensor of first pressure tube sensor 2, and a second pressure signal 11 is recorded with a right pressure sensor of first pressure tube sensor 2. A third pressure signal 12 is recorded with a left pressure sensor of second pressure tube sensor 3, and a fourth pressure signal 13 is recorded with a right pressure sensor of second pressure tube sensor 3. It is particularly apparent that the pressure rise in second pressure tube sensor 3 occurs later than in first pressure tube sensor 2. Impact times $t_1$ and $t_2$ differ by a time difference $\Delta t$, corresponding to distance d between pressure tube sensors 2 and 3. It is further apparent that the pressure rise in the respective left pressure sensors occurs earlier. This is due to the fact that the impact location in the present example is situated left of center of motor vehicle 1, and the pressure waves accordingly reach the left pressure sensors earlier. This example thus involves a collision on the left side.

Figure 4:
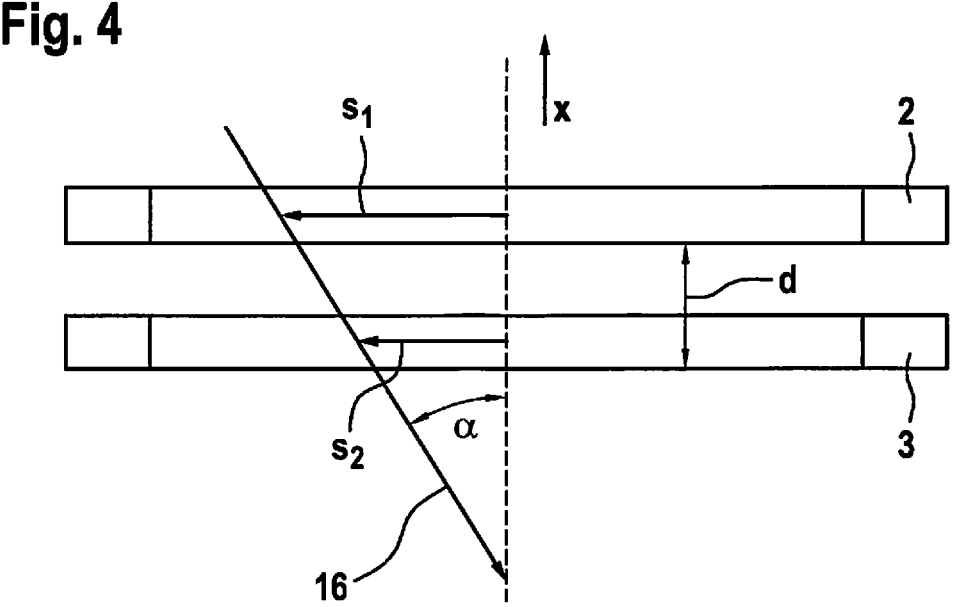
FIG. 4 shows an enlarged illustration of the pressure tube sensors of the motor vehicle from FIGS. 1 and 2.

FIG. 4 shows an enlarged illustration of pressure tube sensors 2 and 3 of motor vehicle 1 from FIGS. 1 and 2. Travel direction x points upwardly in this case. Longitudinal distance d (i.e., measured in direction x) between the two pressure tube sensors 2 and 3 is particularly apparent. The impact of a collision partner is indicated by an arrow 16. The impact takes place at a collision angle $\alpha$. Impact locations $s_1$ and $s_2$ indicate where the collision partner strikes pressure tube sensors 2 and 3, as measured from the center (indicated by a dashed line) of pressure tube sensors 2 and 3.

Figure 5:
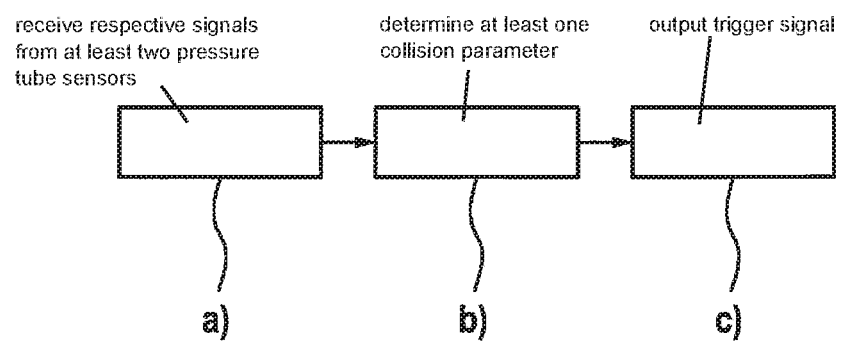
FIG. 5 shows an illustration of the example method according to the present invention.

FIG. 5 is a schematic illustration of a method for generating a trigger signal for triggering at least one safety function 5 of a motor vehicle 1, including the method steps:

a) receiving respective signals from at least two pressure tube sensors 2 and 3, b) determining at least one collision parameter from the signals received according to step a), c) outputting the trigger signal for the at least one safety function 5 as a function of the at least one collision parameter determined in step b).

What is claimed is:

1. A method for generating a trigger signal for triggering at least one safety function of a motor vehicle, the method comprising:
    (a) receiving respective signals from at least two pressure tube sensors;
    (b) determining at least one collision parameter from the received respective signals received according to (a);
    (c) outputting the trigger signal for the at least one safety function as a function of the determined at least one collision parameter determined in (b);
    wherein the pressure tube sensors are connected to a control unit, wherein a safety function is triggerable via the control unit, wherein the control unit is connected to an additional collision recognition system, wherein the pressure tube sensors are spaced apart from one another by a distance in a travel direction of the vehicle, wherein a first pressure tube sensor is installed in a bumper, in absorption foam that rests on a crossbeam, wherein a second pressure tube sensor is mounted on a radiator crossbeam having a mechanical absorption element, and wherein the absorption element couples a force to the second pressure tube sensor in a controlled manner, and
    wherein a pressure rise in the second pressure tube sensor occurs later than in the first pressure tube sensor.

2. The method as recited in claim 1, wherein the at least two pressure tube sensors from which the respective signals are received in (a) are spaced apart from one another at least in the travel direction of the motor vehicle.

3. The method as recited in claim 1, wherein each of the respective signal of the at least two pressure tube sensors received in (a) represent at least one of the following parameters:
    (i) an impact time; and
    (ii) an impact location.

4. The method as recited in claim 1, wherein the at least one collision parameter determined in (b) is at least one of the following:
    (i) a magnitude of a collision speed;
    (ii) a component of the collision speed along a travel direction of the motor vehicle;
    (iii) a collision angle.

5. The method as recited in claim 1, wherein at least one deceleration of the motor vehicle due to a collision is taken into account in (b) in determining a collision speed as the at least one collision parameter.

6. The method as recited in claim 1, wherein the trigger signal is output in (c) when a component of a collision speed along a travel direction of the motor vehicle or a magnitude of the collision speed exceeds a first predefined threshold.

7. The method as recited in claim 6, wherein the first predefined threshold is predefined at least as a function of an impact location of at least one of the pressure tube sensors and/or of a collision angle.

8. The method as recited in claim 1, wherein the trigger signal is output in (c) when a difference between impact times of at least two of the pressure tube sensors falls below a second predefined threshold.

9. The method as recited in claim 8, wherein the second predefined threshold is predefined at least as a function of an impact location of at least one of the pressure tube sensors and/or of a collision angle.

10. The method as recited in claim 1, wherein the trigger signal is output in (c) as a function of at least one parameter of the additional collision recognition system.

11. A control apparatus for a motor vehicle, comprising:
    a control unit to generate a trigger signal for triggering at least one safety function of a motor vehicle, and which is configured to perform the following:
        (a) receive respective signals from at least two pressure tube sensors;
        (b) determine at least one collision parameter from the received respective signals received according to (a);
        c) output the trigger signal for the at least one safety function as a function of the determined at least one collision parameter determined in (b);
    wherein the pressure tube sensors are connected to a control unit, wherein a safety function is triggerable via the control unit, wherein the control unit is connected to an additional collision recognition system, wherein the pressure tube sensors are spaced apart from one another by a distance in a travel direction of the vehicle, wherein a first pressure tube sensor is installed in a bumper, in absorption foam that rests on a crossbeam, wherein a second pressure tube sensor is mounted on a radiator crossbeam having a mechanical absorption element, and wherein the absorption element couples a force to the second pressure tube sensor in a controlled manner, and
    wherein a pressure rise in the second pressure tube sensor occurs later than in the first pressure tube sensor.

12. A non-transitory machine-readable memory medium having a computer program, which is executable by a processor, comprising:
    a program code arrangement having program code for generating a trigger signal for triggering at least one safety function of a motor vehicle, by performing the following:
        (a) receiving respective signals from at least two pressure tube sensors;
        (b) determining at least one collision parameter from the received respective signals received according to (a);
        (c) outputting the trigger signal for the at least one safety function as a function of the determined at least one collision parameter determined in (b);
    wherein the pressure tube sensors are connected to a control unit, wherein a safety function is triggerable via the control unit, wherein the control unit is connected to an additional collision recognition system, wherein the pressure tube sensors are spaced apart from one another by a distance in a travel direction of the vehicle, wherein a first pressure tube sensor is installed in a bumper, in absorption foam that rests on a crossbeam, wherein a second pressure tube sensor is mounted on a radiator crossbeam having a mechanical absorption element, and wherein the absorption element couples a force to the second pressure tube sensor in a controlled manner, and wherein a pressure rise in the second pressure tube sensor occurs later than in the first pressure tube sensor.

* * * * *